United States Patent
Donohoe et al.

(10) Patent No.: US 9,217,090 B2
(45) Date of Patent: Dec. 22, 2015

(54) METHOD AND SYSTEM FOR INK JET PRINTING IMAGES TO COMPLEX CONTOURED SURFACES OF CERAMIC AND GLASS ITEMS SUCH AS DISHWARE

(75) Inventors: John Donohoe, Big Flats, NY (US); Michael J. Sullivan, Corning, NY (US); Richard J. Lugen, Painted Post, NY (US); Kenneth A. Kirk, Corning, NY (US)

(73) Assignee: WKI HOLDING COMPANY, INC., Rosemont, IL (US)

( * ) Notice: Subject to any disclaimer, the term of this patent is extended or adjusted under 35 U.S.C. 154(b) by 949 days.

(21) Appl. No.: 13/408,857

(22) Filed: Feb. 29, 2012

(65) Prior Publication Data

US 2013/0224445 A1    Aug. 29, 2013

(51) Int. Cl.
*B32B 1/00* (2006.01)
*B41M 5/00* (2006.01)
*C09D 11/30* (2014.01)
*C09D 11/322* (2014.01)
*C03C 17/34* (2006.01)

(52) U.S. Cl.
CPC .............. *C09D 11/30* (2013.01); *C03C 17/34* (2013.01); *C09D 11/322* (2013.01); *B41M 5/007* (2013.01); *B41M 5/0023* (2013.01); *B41M 5/0047* (2013.01); *C03C 2217/475* (2013.01); *Y10T 428/24736* (2015.01); *Y10T 428/24851* (2015.01)

(58) Field of Classification Search
CPC .. B41M 5/0023; B41M 5/0047; B41M 5/007; A47J 47/16; A47J 27/002; A47J 36/02; C09D 11/30; C09D 11/322; Y10T 428/24736

USPC ............ 428/187, 426, 323, 195.1, 914; 220/573.1, 573.3
See application file for complete search history.

(56) References Cited

U.S. PATENT DOCUMENTS

| | | |
|---|---|---|
| 4,393,108 A | 7/1983 | Barker et al. |
| 4,843,958 A | 7/1989 | Egosi |
| 5,273,575 A | 12/1993 | de Saint Romain |
| 5,407,474 A | 4/1995 | Airey et al. |
| 5,418,041 A | 5/1995 | Kent et al. |
| 5,449,426 A | 9/1995 | Lin |
| 5,831,641 A | 11/1998 | Carlson |
| 5,976,674 A | 11/1999 | Sugimoto et al. |
| 6,357,868 B1 | 3/2002 | Pfaff et al. |
| 6,402,823 B1 | 6/2002 | Garcia Sainz et al. |
| 6,416,174 B1 | 7/2002 | Ito et al. |
| 6,487,386 B1 | 11/2002 | Zimmer et al. |
| 6,523,921 B2 | 2/2003 | Codos |
| 6,538,767 B1 | 3/2003 | Over et al. |
| 6,745,684 B1 | 6/2004 | Zimmer et al. |
| 6,923,115 B1 | 8/2005 | Litscher et al. |

(Continued)

FOREIGN PATENT DOCUMENTS

WO    WO 2008101539 A3 * 11/2008

*Primary Examiner* — Catherine A Simone
(74) *Attorney, Agent, or Firm* — McDermott Will & Emery LLP

(57) ABSTRACT

A glass or ceramic dishware item with an image disposed thereon is provided. The image is transferred, at ambient temperature, to the surface of the dishware from an ink composite by using a silicone transfer substrate. The ink composite is dispensed by an inkjet head. Methods and systems for producing ink composites and dishware using ink composites are also provided.

4 Claims, 2 Drawing Sheets

(56) References Cited

U.S. PATENT DOCUMENTS

| | | |
|---|---|---|
| 7,270,407 B2 | 9/2007 | Kabalnov et al. |
| 7,291,364 B2 | 11/2007 | Faulkner et al. |
| 7,407,250 B2 | 8/2008 | Jones et al. |
| 7,803,221 B2 | 9/2010 | Magdassi et al. |
| 7,976,906 B2 | 7/2011 | Eron |
| 8,163,077 B2 | 4/2012 | Eron et al. |
| 8,445,065 B2 * | 5/2013 | Yeong et al. .................. 427/269 |
| 2001/0019340 A1 | 9/2001 | Kubo et al. |
| 2002/0097280 A1 | 7/2002 | Loper et al. |
| 2004/0252174 A1 | 12/2004 | Baxter et al. |
| 2005/0178279 A1 | 8/2005 | Valls |
| 2007/0031603 A1 | 2/2007 | Eron |
| 2007/0070099 A1 | 3/2007 | Beer et al. |
| 2008/0090015 A1 | 4/2008 | Alfaro |
| 2008/0194733 A1 | 8/2008 | Green et al. |
| 2008/0210122 A1 | 9/2008 | Magdassi et al. |
| 2009/0117276 A1 * | 5/2009 | Ito .................................. 427/256 |
| 2009/0169719 A1 | 7/2009 | Orr |
| 2009/0295846 A1 | 12/2009 | Simke |
| 2010/0098952 A1 | 4/2010 | Yeong et al. |
| 2010/0315459 A1 | 12/2010 | Chang et al. |
| 2012/0007930 A1 | 1/2012 | Eron |

* cited by examiner

METHOD AND SYSTEM FOR INK JET PRINTING IMAGES TO COMPLEX CONTOURED SURFACES OF CERAMIC AND GLASS ITEMS SUCH AS DISHWARE

TECHNICAL FIELD

The invention relates to a method of printing on ceramic, glass-ceramic and glass, and more particularly for printing inkjet images to complex contoured surfaces of glass and ceramic items such as dishware.

BACKGROUND OF THE INVENTION

It is known to apply designs to ceramic, glass-ceramic and glass products such as, for example, tableware, bakeware and other dishware to aesthetically enhance the appearance of the product. Several methods have been employed for applying designs to such products.

According to one process, ceramic pigments are directly printed on glass and ceramic products by means of traditional printing techniques. According to such printing methods, pigments are baked into the surface of the product. As a result, a permanent printed image is obtained on the product. However, this process requires extensive manual preparation and labor. Moreover, the technique is not amenable to consistent reproduction of colors in large quantities. Among other disadvantages of such direct printing is the inability to maintain the resolution quality or the uniformity of the color printing.

Another known process for printing to ceramic, glass-ceramic and glass products relies on the technique of decal image transference. Typically, pigments are transferred via a transfer agent, such as a paper coated with gum arabic. In decal image transference, pigments can be applied to the transfer agent by various printing techniques. For example, conventional ceramic pigments can be applied to the transfer agent by screen printing, such as via rotary screen printing. However, rotary screen printing onto ceramic, glass-ceramic and glass products is labor intensive. Moreover, image reproduction using rotary screen printing typically requires the addition of heat to set an image transferred to the workpiece. Alternatively, ceramic toner may be used in connection with decal transference instead of conventional printing pigments or inks. In these instances, the ceramic toner can be applied to the transfer agent by electrostatic or electrophotographic reproduction method. In such a process, the transfer agent is applied to the ceramic or glass article at the desired position and either moistened or heated. The transfer agent is then removed leaving the pigmented image on the article. Following the transfer, the product is fired to fuse the pigment with the product.

This process also has certain inherent disadvantages. One disadvantage is that the image must be printed on discrete sheets of the transfer agent that must be manipulated during further processing. Thus, the printing process is inherently less efficient than an otherwise automated process would be. Moreover, because each transfer agent sheet requires separate handling, consistent reproducibility of the image is extremely difficult.

Another process for printing to ceramic and glass products is described in U.S. Pat. Nos. 6,487,386 and 6,745,684 in which electrostatic or electrophotographic methods are used in a process to apply ceramic toner directly to the ceramic or glass product.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

According to one embodiment of the disclosure, an ink composite for use in applying a digital inkjet printing to a contoured ceramic, glass-ceramic or glass substrate is provided. The ink composite is a blended medium that includes an inkjet ink, an organic medium, an organic solvent and frit. The blended medium has a viscosity suitable for dispensing from an inkjet print head.

According to another embodiment of the disclosure, a layered ink composite for use in applying digital inkjet printing to a contoured ceramic, glass-ceramic or glass substrate is provided. The layered ink composite includes a first organic layer, an image layer and a second organic layer. The first organic layer includes an organic medium and frit. The image layer includes an inkjet ink. The second organic layer includes an organic medium and frit. Each of the first organic layer, the image layer and the second organic layer has a viscosity suitable for dispensing from an inkjet head.

According to yet another embodiment of the disclosure, a method of printing a digital image to a contoured surface of a ceramic, glass-ceramic or glass workpiece is provided. The method includes preparing an ink composite by depositing a blended medium including an inkjet ink, an organic medium, an organic solvent and frit. The blended medium is configured in the form of a digital image and has a viscosity suitable for dispensing from an inkjet head. The method further includes transferring at or near room temperature the image from the ink composite to a contoured surface of a workpiece by moving one of either the blended medium and the contoured surface of the workpiece into contact with the other of the blended medium and the contoured surface of the workpiece.

According to another embodiment of the disclosure, a method of printing a digital image to a contoured surface of a ceramic, glass-ceramic or glass workpiece is provided. The method includes the step of preparing a layered ink composite. A first organic layer comprising an organic medium and frit is deposited, the first organic layer having a viscosity suitable for dispensing from an inkjet head. Inkjet ink is deposited onto the first organic layer, the deposited inkjet ink being configured as a digitally generated image and having a viscosity suitable for dispensing from an ink jet head. A second organic layer comprising an organic medium and frit is deposited onto the inkjet ink, the second organic layer having a viscosity suitable for dispensing from an inkjet head. The method further includes transferring at or near room temperature the image from the layered ink composite to a contoured surface of a workpiece by moving one of either the second organic layer and the contoured surface of the workpiece into contact with the other of the second organic layer and the contoured surface of the workpiece.

According to still another embodiment of the disclosure, a glass, glass-ceramic or ceramic dishware item having a contoured surface with an image disposed thereon is provided. The disposed image is created by creating an ink composite through depositing a blended medium comprising an inkjet ink, an organic medium, an organic solvent and frit. The blended medium has a viscosity suitable for dispensing from an inkjet head and is configured in the form of an image. The image from the ink composite is transferred at or near room temperature to the contoured surface of a workpiece by moving the blended medium and the contoured surface of the workpiece into contact with the other of the blended medium and the contoured surface of the workpiece, depositing a first layer of organic ink onto a silicone substrate.

According to another embodiment of the disclosure, a glass, glass-ceramic or ceramic dishware item having a contoured surface with an image disposed thereon is provided. The image is transferred to the contoured surface from a layered ink composite. The layered ink composite is created by depositing a first organic layer comprising an organic medium and frit, the first organic layer having a viscosity suitable for dispensing from an inkjet head. Inkjet ink is deposited onto the first organic layer, the deposited inkjet ink configured as a digitally generated image and having a viscosity suitable for dispensing from an ink jet head. A second organic layer comprising an organic medium and frit is deposited onto the inkjet ink, the second organic layer having a viscosity suitable for dispensing from an inkjet head. The image is transferred at or near room temperature from the layered ink composite to a contoured surface of a workpiece by moving one of either the second organic layer and the contoured surface of the workpiece into contact with the other of the second organic layer and the contoured surface of the workpiece.

According to yet another embodiment of the disclosure, a printing system for printing a digitally generated image to a contoured surface of a ceramic, glass-ceramic or glass workpiece is provided. The printing system includes an inkjet print head configured to dispense a blended medium comprising an inkjet ink, an organic medium, an organic solvent and frit. The blended medium has a viscosity suitable for dispensing from the inkjet print head.

According to another embodiment of the disclosure, a printing system for printing a digitally generated image to a contoured surface of a ceramic, glass-ceramic or glass workpiece is provided. The printing system includes an inkjet print head configured to dispense a first organic layer comprising an organic medium and frit, the first organic layer having a viscosity suitable for dispensing from the at least one inkjet head. The inkjet print head is also configured to dispense an image layer comprising an inkjet ink, the image layer having a viscosity suitable for dispensing from the at least one inkjet head. The inkjet print head is further configured to dispense a second organic layer comprising an organic medium and frit, the second organic layer having a viscosity suitable for dispensing from the at least one inkjet head.

Further aspects of the disclosure include the inkjet ink having a pigment of a particle size suitable for dispensing from the inkjet head and the frit having a particle size suitable for dispensing from the inkjet head. Additional aspects of the disclosure include the blended organic medium forming a single layer of the ink composite, as well as the viscosity of the blended medium being less than or equal to about 20 centipoise. Another aspect of the disclosure includes the first organic layer having a first constituent layer of organic medium and a second constituent layer of frit and the second organic layer having a first constituent layer of organic medium and a second constituent layer of frit. A further aspect of the disclosure includes the viscosity of each of the first organic layer, image layer and second organic layer being less than or equal to about 20 centipoise. Yet another aspect of the disclosure includes the step of firing the workpiece at a temperature sufficient to oxidize and volatize the organic constituents of the blended medium to increase to viscosity of the blended medium.

A further aspect of the disclosure includes the step of depositing the first organic layer by depositing the frit onto the organic medium before the step of depositing the inkjet ink, and the step of depositing the second organic layer by depositing the frit onto the deposited inkjet ink before depositing the organic medium onto the frit. Another aspect of the disclosure includes the step of firing the dishware item at a temperature of 300° to 790° C. Yet another aspect of the disclosure includes a conveyor disposed proximate the at least one inkjet head, the conveyor being adapted to advance a silicone substrate that receives the first organic layer, the image layer and the second organic layer. Still another aspect of the disclosure includes a first inkjet head, a second inkjet head and a third inkjet head, wherein the first inkjet head deposits the first organic layer, the second inkjet head deposits the image layer and the third inkjet head deposits the second organic layer.

Other features and advantages of the invention will be apparent from the following specification taken in conjunction with the following drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. The components in the drawings are not necessarily to scale, emphasis instead being placed upon clearly illustrating the principles of the present invention. In the drawings.

DETAILED DESCRIPTION

Figure 1:
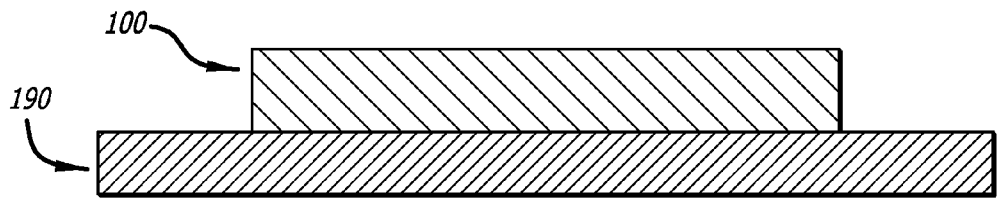
FIG. 1 is a cross-sectional view of an embodiment of an ink composite and substrate according to the disclosure.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 4:
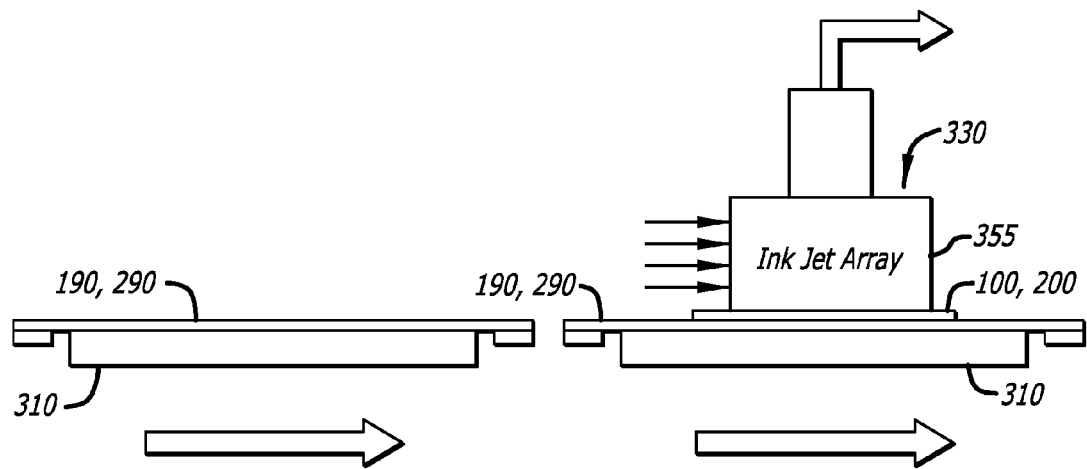
FIG. 4 is a side view of a portion of an embodiment of a printing system according to the disclosure.
Figure 5:
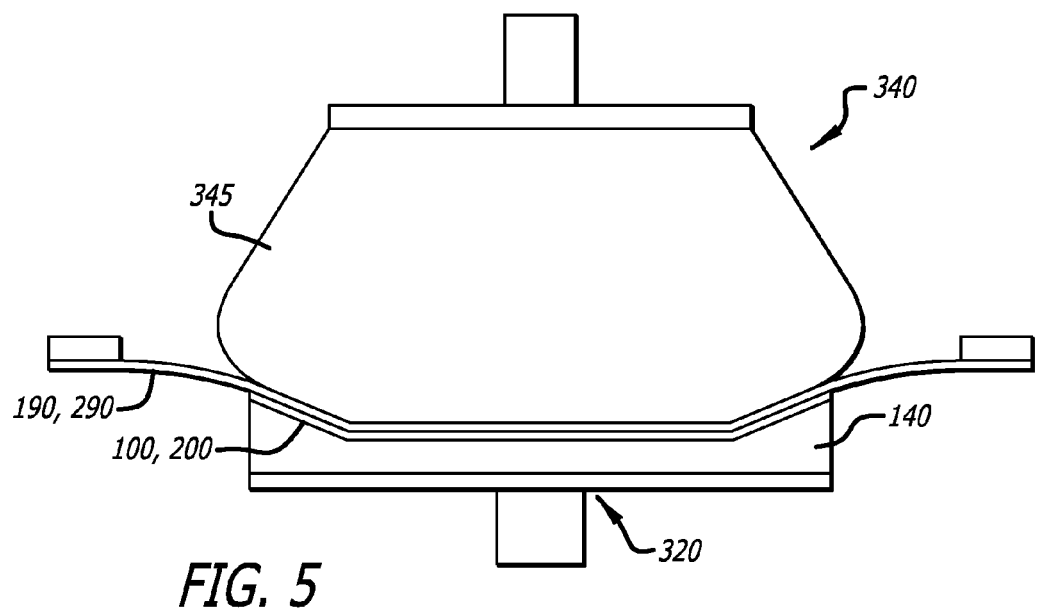
FIG. 5 is a side view of another portion of the embodiment of the printing system according to the disclosure.

According to one embodiment, a method of printing a digital image to a contoured surface of a ceramic, glass-ceramic or glass workpiece is provided. More particularly, the method of printing can be used on contoured ceramic dishware formed and baked out of clay, porcelain, stoneware, earthenware, steatite, rutile, cordierite and cermet. The present invention can also be employed with glass dishware items. For example, the present invention can be suitably employed with glass tableware, servingware and bakeware sold under the brand name Corelle®, or on glass items formed from a combination of silicates. Referring now to FIGS. 1, 4 and 5, the method generally includes the steps of preparing a blended ink composite 100 that includes a desired image to be transferred, transferring the image to the ceramic or glass item, and firing the item at an appropriate temperature.

As shown in FIG. 1, a desired image is transferred to the ceramic, glass-ceramic or glass item by preparing a blended ink composite 100. The blended ink composite 100 is a blended medium including inkjet ink, an organic medium, an organic solvent and frit. The blended medium exhibits a viscosity suitable for dispensing from an inkjet head. The blended ink composite 100 is deposited as a single blended medium onto a substrate 190, as shown in FIG. 4, the blended medium being configured in the form of a digital image. The image is then transferred, at or near ambient temperature, from the blended ink composite 100 to a contoured surface of a workpiece 140 as shown in FIG. 5. Specifically, the blended ink composite 100 and the contoured surface of the workpiece 140 are moved into contact with each other. The workpiece 140, bearing the desired image, is then fired to cure the workpiece 140. The preferred structure of the layered ink composite 100 will now be described.

The blended ink composite 100 is preferably formulated from an organic medium, suitable for ceramics and glass, an ink additive thinner, a frit and inkjet ink. The medium is a liquid blend consisting of a cohesive resin or resin blend and suitable diluents formulated for release off of silicone transfer surfaces. Examples include PLT9 sold by Pad Print Machinery of Vermont, NR 232 from W. C. Heraeus, DD59/11 and 1366 from Ferro, and 4422 from Markem. The thinner is preferably a compatible organic compound or mixture of compounds with boiling point between 120 and 250° C., such as alcohols, esters, aromatic hydrocarbons, ketones, glycol ethers or glycol ether esters. One preferred frit is the leadless composition described in U.S. Pat. No. 4,590,171. However, other frits with suitable softening point, coefficient of thermal expansion and detergent resistance can be used. It will be understood by one of ordinary skill in the art that any inkjet ink suitable for use in inkjet methods can be employed without departing from the present disclosure. The blended ink composite 100 may include a pad printing medium and frit combined with a solvent and inkjet ink, such that the viscosity of the blended ink composite 100 is low enough to be dispensed by an inkjet head. Also, after being deposited, the blended ink composite 100 may be heated such that the solvent evaporates, thereby increasing the viscosity of the blended ink composite 100.

The blended ink composite 100 exhibits high permanent pressure sensitivity at or near room temperature and a low affinity to silicone surfaces. The blended ink composite 100 also exhibits high cohesive strength and high thermal stability. These properties enable the blended ink composite 100 to be readily transferred between surfaces for which it has differing degrees of affinity and to be easily released from the transferring surface.

More specifically, according to the present disclosure, the blended ink composite 100 preferably exhibits high tack and cohesive strength when cooled to a solid or semi-solid (high viscosity) state. When the blended ink composite 100 is ultimately contacted with the contoured surface of the workpiece 140, elements of the blended ink composite 100, such as the organic medium and frit, may form a cover coating over the inkjet ink that defines a desired image, for example. As such, the blended ink composite 100 will assist in minimizing any material release from the inkjet ink contained within the blended ink composite 100.

According to another embodiment, another method of printing a digital image to a contoured surface of a ceramic, glass-ceramic or glass workpiece is provided. More particularly, a layered ink composite 200 is used instead of the blended ink composite 100. Referring now to FIGS. 2 through 5, the method generally includes the steps of preparing the blended ink composite 200 that includes a desired image to be transferred, transferring the image to the ceramic or glass item, and firing the item at an appropriate temperature.

Figure 2:
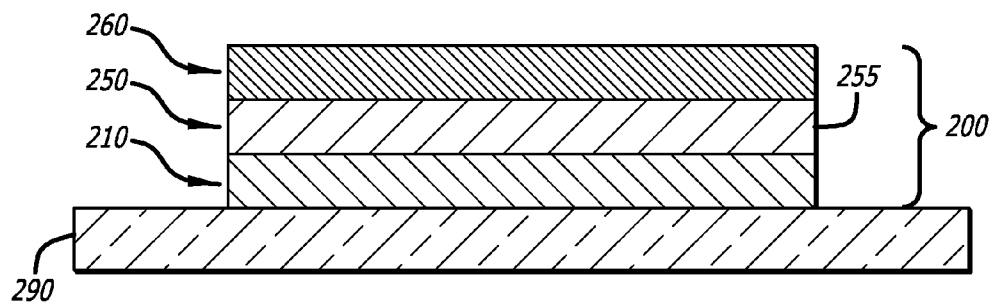
FIG. 2 is a cross-sectional view of another embodiment of an ink composite and substrate according to the disclosure.

As shown in FIG. 2, a desired image is transferred to the ceramic, glass-ceramic or glass item by building a layered ink composite 200. The layered ink composite 200 includes a first organic layer 210, an image layer 250 and a second organic layer 260. As will also be discussed in further detail herein, the first organic layer 210 includes an organic medium and frit. The first organic layer 210 also exhibits a viscosity suitable for dispensing from an inkjet head. The image layer 250 is comprised of an inkjet ink 255. As will also be discussed in further detail herein, the second organic layer 260 includes an organic medium and frit. The second organic layer 260 also exhibits a viscosity suitable for dispensing from an inkjet head.

Figure 3:
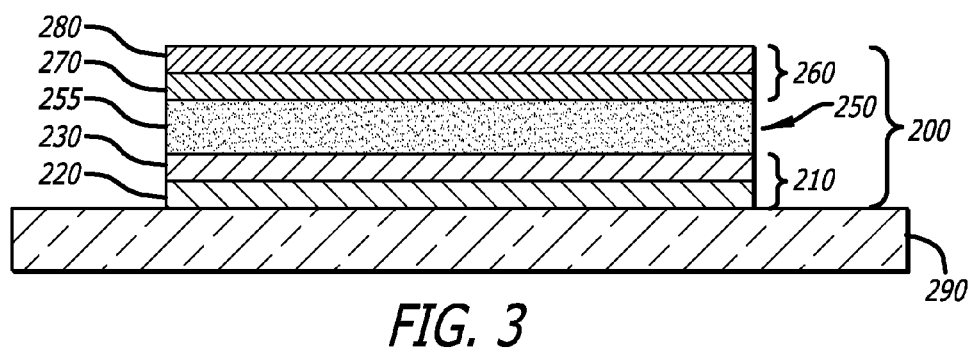
FIG. 3 is a cross-sectional view of yet another embodiment of an ink composite and substrate according to the disclosure.

As shown in FIG. 2, a first organic layer 210 is deposited onto a silicone transfer substrate 290. The first organic layer 210 may be deposited as a single blended layer of organic medium and frit. Alternatively, the first organic layer 210 may be formed of two layers including a first medium layer 220 and a first frit layer 230, as shown in FIG. 3. For example, the first medium layer 220 may be deposited onto the substrate 290 and the first frit layer 230 may then be deposited onto the first medium layer 220. Inkjet ink 255 is then deposited onto the first organic layer 210 in the configuration of a digitally generated image to create an image layer 250. A second organic layer 260 is then deposited onto the image layer 250. As with the first organic layer 210, the second organic layer 260 may be deposited as a single blended layer of organic medium and frit, as shown in FIG. 2, or as two layers, such as a second frit layer 270 and a second medium layer 280, as shown in FIG. 3. For example, the second frit layer 270 may be deposited onto the image layer 250 and the second medium layer 280 may then be deposited onto the second frit layer 270. The image is then transferred, at or near ambient temperature, from the layered ink composite 200 to a contoured surface of a workpiece 240 as shown in FIG. 5. Specifically, the second organic layer 260 and the contoured surface of the workpiece 140 are moved into contact with each other. The workpiece 140, bearing the desired image, is then fired to cure the workpiece 140. The preferred structure of the layered ink composite 200 will now be described.

The first organic layer 210 exhibits high permanent pressure sensitivity at or near room temperature and a low affinity to silicone surfaces. The first organic layer 210 also exhibits high cohesive strength and high thermal stability. These properties enable the first organic layer 210 to be readily transferred between surfaces for which it has differing degrees of affinity and to be easily released from the transferring surface.

More specifically, according to the present disclosure, the first organic layer 210 preferably exhibits high tack and cohesive strength when cooled to a solid or semi-solid (high viscosity) state. When the layered ink composite 200 is ultimately contacted with the contoured surface of the workpiece 140, the first organic layer 210 will, in effect, form a cover coating over the inkjet ink 255 that defines the desired image. As such, the first organic layer 210 will assist in minimizing any material release from the inkjet ink 255.

The first organic layer 210 is preferably formulated from an organic medium, suitable for ceramics and glass, an ink additive thinner and a frit. For example, the first organic layer 210 may include a pad printing medium and frit combined with a solvent such that the viscosity of the first organic layer 210 is low enough to be dispensed by an inkjet head. Also, after being deposited, the first organic layer 210 may be heated such that the solvent evaporates, thereby increasing the viscosity of the first organic layer 210.

The second layer, or the image layer 250, is generally comprised of inkjet ink 255. It will be understood by one of ordinary skill in the art that any inkjet ink suitable for use in inkjet methods can be employed without departing from the present disclosure.

The third layer of the layered ink composite 200, or the second organic layer 260, is also generally comprised of an organic medium and frit. The second organic layer 260 is provided as a vehicle for transferring the inkjet ink 255 design and first organic layer 210 from the silicone transfer substrate 290 to the ceramic or glass workpiece 140. Thus it will be understood that the second organic layer 260 will exhibit sufficient tack to cause adherence to the ceramic or glass workpiece 140 upon contact at room temperature, and still provide sufficient cohesive strength to adhere to the silicone transfer substrate 290.

In a preferred embodiment, this second organic layer 260 has the same characteristics and is similar in formulation to the first organic layer 210. For example, the second organic layer 260 also preferably exhibits relatively high permanent pressure sensitivity at room temperature and a relatively low affinity to silicone surfaces.

According to the present disclosure, a printing system 300 for printing a digitally generated image in accordance with the methods described above is also provided. As shown in FIGS. 4 and 5, the system generally includes a substrate handling assembly 310, a workpiece handling assembly 320, an inkjet array 330 and a transfer assembly 340. The substrate handling assembly 310 facilitates movement and/or handling of substrates 190, 290, such as a conveyor assembly or a robotic arm assembly, for example. Similarly, the workpiece handling assembly 320 facilitates movement and/or handling of workpiece 140. The substrate handling assembly 310 may be coupled to a control system that allows incremental indexing at the inkjet array 330 to accommodate the deposition of materials as appropriate.

The inkjet array 330 dispenses material onto the substrate 190, 290. For example, the inkjet array 330 may dispense each layer of the layered ink composite 200 onto silicone transfer substrate 290. Similarly, the inkjet array 330 may dispense the blended medium of blended ink composite 100 onto silicone transfer substrate 190. The inkjet array 330 includes one or more heads 335 for dispensing materials. The head 335 may be configured to dispense one material or multiple materials. For example, the inkjet array 330 may have one head 335 that separately dispenses each of the first medium layer 220, the first frit layer 230, the inkjet ink 255, the second frit layer 270 and the second medium layer 280. Alternatively, the inkjet array 330 may have three heads 355, such that the first head 355 dispenses medium layers 220, 280, the second head 355 dispenses inkjet ink 255, and the third head 355 dispenses frit layers 230, 270. Any number of heads 355 dispensing any number of materials is also considered by the present disclosure. Alternatively, the inkjet array 330 may dispense a blended ink composite 100 using any number of heads 355. The transfer assembly 340 includes a presshead 345. The presshead 345 presses the substrate 190, 290 to the workpiece 140 to transfer the image to the workpiece 140.

Thus, in employing printing system 300 described herein, an image can be applied to a contoured glass or ceramic dishware item. For example, a silicone transfer substrate 290 is placed on the substrate handling assembly 310 and then moved to the inkjet array 330. The inkjet array 330 deposits a first organic layer 210 onto the silicone transfer substrate 290, then deposits inkjet ink 255 onto the first organic layer 210 to form the image layer 250, and then deposits a second organic layer 260 onto the image layer 250, thereby forming a layered ink composite 200 on the silicone transfer substrate 290. The substrate handling assembly 310 then moves the silicone transfer substrate 290 with the layered ink composite 200 to the transfer assembly 340. A workpiece 140 is placed on the workpiece handling assembly 320, which moves or positions the workpiece 140 at the transfer assembly 340. The transfer assembly 340 moves the presshead 345 so that the presshead 345 presses the silicone transfer substrate 290 into the workpiece 140, thereby causing the layered ink composite 200 to contact at least one surface of the workpiece 140 and transferring the image to the workpiece 140. The presshead 345 is then retracted or removed and the workpiece 140 with the transferred image is then ready to be fired, preferably at a temperature of about 300° to about 790° C.

While the specific embodiments have been illustrated and described, numerous modifications come to mind without significantly departing from the spirit of the invention, and the scope of protection is only limited by the scope of the accompanying claims.

What is claimed is:

1. A layered ink composite for use in applying a digital inkjet printing to a contoured ceramic, glass-ceramic or glass substrate, the layered ink composite comprising:
    a first organic layer comprising an organic medium and frit, the first organic layer having a viscosity suitable for dispensing from an inkjet head;
    an image layer comprising an inkjet ink, the image layer having a viscosity suitable for dispensing from an ink jet head; and
    a second organic layer comprising an organic medium and frit, the second organic layer having a viscosity suitable for dispensing from an inkjet head, wherein the first organic layer comprises a first constituent layer of organic medium and a second constituent layer of frit and the second organic layer comprises a first constituent layer of organic medium and a second constituent layer of frit.

2. The layered ink composite of claim 1, wherein the viscosity of each of the first organic layer, image layer and second organic layer is less than or equal to about 20 centipoise.

3. A glass, glass-ceramic or ceramic dishware item having a contoured surface with an image disposed thereon, the image transferred from a layered ink composite, wherein the layered ink composite is created by:
    depositing a first organic layer comprising an organic medium and frit, the first organic layer having a viscosity suitable for dispensing from an inkjet head;
    depositing inkjet ink onto the first organic layer, the deposited inkjet ink configured as a digitally generated image and having a viscosity suitable for dispensing from an ink jet head; and
    depositing a second organic layer comprising an organic medium and frit onto the deposited inkjet ink, the second organic layer having a viscosity suitable for dispensing from an inkjet head, wherein the image is transferred at or near room temperature from the layered ink composite to a contoured surface of a workpiece by moving one of either the second organic layer and the contoured surface of the workpiece into contact with the other of the second organic layer and the contoured surface of the workpiece; and
    wherein the frit of the first organic layer is deposited onto the organic medium before the inkjet ink is deposited; and the frit of the second organic layer is deposited onto the deposited inkjet ink before the organic medium is deposited onto the frit.

4. The glass, glass-ceramic or ceramic dishware item of claim 3, further comprising the step of firing the dishware item at a temperature of 300° to 790° C.

* * * * *